United States Patent Office 3,172,804
Patented Mar. 9, 1965

3,172,804
METHOD OF CONTROLLING NEMATODES
Donald S. Cannon, Ringoes, N.J., assignor to American Cyanamid Company, Stamford, Conn., a corporation of Maine
No Drawing. Filed Feb. 11, 1963, Ser. No. 257,732
10 Claims. (Cl. 167—30)

This invention relates to the control of nematodes and other parasitic worm life which exists in the soil at some stage of their life cycles, for example, eggs, larvae and adult worms.

The most common commercial nematocides (1,2-dichloropropene-1,3-dichloropropane and ethylene dibromide) are used for the control of phytophagus nematodes by introducing them into the soil as liquids which volatilize, redistribute through the soil as a gas, and dissipate into the air. Because many such compounds are phytotoxic at nematocidal concentrations, planting must be delayed for one to two weeks following treatment during which time reinfestations of the soil may occur.

Compounds to be most useful in the control of phytophagus nematodes must be capable of preventing nematodes from attacking the host plant at concentrations not injurious to plant life. In addition, suitable compounds should be characterized by sufficiently low vapor pressure to minimize their vapor loss from the soil. Further, of course, a very desirable property of a suitable nematocide is its ability to give prolonged protection against nematodes following initial application. Such persistence or residual effect in the soil assures prolonged protection from post treatment attacks by the nematodes.

A still further desirable property of a suitable nematocide is that it be capable of being applied in numerous physical forms as, for example, as a granular soil mix or as a liquid drench either in the form of a solution or emulsion.

It is the principal object of the present invention to provide a method of controlling nematodes with a novel group of nematocidally active compounds in which the properties of nematocides set forth hereinabove are for the most part satisfactorily fulfilled.

Thus, in accordance with the present invention a method is provided for controlling nematodes in the soil which comprises applying thereto various sulfamoylphenyl organic phosphorothioates and sulfamoylphenyl organic phosphates.

The phosphorothioates and phosphates suitable for use in accordance with the present invention are those having the following structural formula:

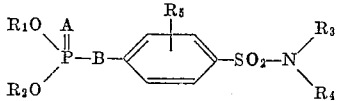

in which $R_1$ and $R_2$ are alkyl groups having from one to three carbon atoms, A and B are selected from the group consisting of O and S, $R_3$ and $R_4$ are selected from the group consisting of hydrogen and lower alkyl and $R_5$ is selected from the group consisting of hydrogen, halogen and lower alkyl.

In general, the compounds of the present invention may be prepared by reacting an appropriate benzene sulfonate with acetic anhydride to form the corresponding acetoxy sulfonate which is then reacted with phosphorous pentachloride to produce a corresponding sulfonylchloride. This compound is then treated with an amine to form the sulfonamide which is then reacted under suitable conditions in the presence of a suitable aqueous or inert polar solvent such as water, acetone or methyl ethyl ketone, etc., with an appropriate phosphorochloridothioate or phosphoryl chloride to produce the corresponding sulfamoylphenyl ester of phosphorothioic or phosphoric acid. See U.S.P. 3,005,004 and U.S.P. 3,005,002.

These phosphorothioates and phosphates may be formulated as granules for application with a conventional fertilizer spreader, as emulsifiable concentrate or as wettable powder for application with a sprayer, or as a dust for application with a conventional duster, or they may be absorbed on activated carbon for application to seeds.

Preferably the compounds are incorporated into a variety of solids or liquid carriers or diluents. Such compositions can be prepared either as a suspension in a suitable non-solvent or as a dust. A suspension or dispersion of the nematocidal compound in a non-solvent such as water may be prepared for direct application to infested soil. Alternatively, a prepared suspension of the compound may be modified by the addition thereto of small amounts, usually of from one to about five parts of a commercially available dispersing or surfactant agent per one hundred parts of the nematocidal compound. Typically such surfactants are well known and might include the sodium salts of polymerized propyl naphthalene sulfonic acid, alkyl aryl polyether alcohols, and a modified phthalic glycerol alkyd resin.

In the preparation of dusts, the nematocidal compound may be admixed with a finely divided inert granular material as a carrier in any conventional manner. Useful carriers include talc, kaolin, silica, chalk, wood flour, fuller's earth, activated carbon and the like.

In order that the present invention may be more fully understood the following examples are given primarily by way of illustration. No specific details or enumerations contained therein should be construed as limitations on the present invention except insofar as they appear in the appended claims.

EXAMPLE 1

A number of compounds contemplated for use in accordance with the present invention, which compounds are identified in Table I below, were tested for nematocidal activity against the vinegar eelworm, Anguillula sp. In this test the compounds are employed at a concentration of 0.1% and 0.01% in 4 cc. of solution containing approximately 100 such worms. The eelworms are examined immediately following a twenty-hour period of intimate contact with these compounds, and the percent mortality of the eelworm is recorded.

The results of this test employing various compounds are reported in Table I hereinbelow.

Table I

| | Percent Mortality at indicated percent Concentration | |
|---|---|---|
| | 0.1 | .01 |
| O,O-dimethyl-O-p(dimethylsulfamoyl)phenyl phosphate | 100 | 75 |
| O,O-diethyl-O-p(dimethylsulfamoyl)phenyl phosphate | 100 | 75 |
| O,O-diethyl-S-p-sulfamoylphenyl phosphorodithioate | 75 | 0 |
| O,O-diethyl-O-p-sulfamoylphenyl phosphorothioate | 100 | 0 |
| O,O-dimethyl-O-(3-methyl-4-N,N-dimethylsulfamoyl)phenylphosphorothioate | 30 | ---------- |
| Dimethyl-4-dimethylsulfamoyl-3-methyl phenyl phosphate | 95 | 95 |
| O,O-dimethyl-O-(3-methyl-4-N-methylsulfamoyl)phenyl phosphorothioate | 80 | ---------- |
| O,O-dimethyl-O-(3-methyl-4-sulfamoyl)phenyl phosphorothioate | 90 | ---------- |
| O,O-diethyl-O-(3-methyl-4-N-methylsulfamoyl)-phenyl phosphorothioate | 95 | ---------- |
| O,O-diethyl-O-(3-methyl-4-sulfamoyl)phenyl phosphorothioate | 90 | ---------- |
| O,O-diethyl-O-(3-methyl-4-sulfamoyl)phenyl phosphate | 100 | ---------- |
| O-[2-chloro-4-(dimethylsulfamoyl)phenyl] O,O-dimethyl phosphorothioate | 90 | 0 |

EXAMPLE 2

A measured amount of the compounds identified in Table II hereinbelow was dissolved in a suitable organic solvent and mixed thoroughly with sandy loam soil in a mechanical tumbler. An aqueous slurry of root-knot nematode (Meloidogyne species) infested tomato roots containing eggs, larvae, and adults was added to the treated soil. Seven days later a small tomato transplant was planted in the treated soil. Each treatment was duplicated. Twenty-one days after the planting, the tomato plant was removed and examined for root-knot nematode gall development.

The results which are expressed as a degree of root-galling and phytotoxicity are set forth in Table II below.

Table II

| Compound | Roots-Galled Rating and Phytotoxicity Rating at Indicated Number of Pounds Per Acre | | | | | |
|---|---|---|---|---|---|---|
| | 50 | | 25 | | 10 | |
| | Roots-Galled Rating | Phyto-toxicity Rating | Roots-Galled Rating | Phyto-toxicity Rating | Roots-Galled Rating | Phyto-toxicity Rating |
| O,O-dimethyl-O-p-sulfamoylphenyl phosphorothioate | 0 | 0 | ---- | 0 | ---- | 0 |
| O,O-dimethyl-O-p-sulfamoylphenyl phosphate | 0 | 0 | ---- | 0 | ---- | 0 |
| O,O-dimethyl-O-p-(dimethylsulfamoyl) phenyl phosphate | 0 | 0 | 2 | 0 | ---- | 0 |
| O,O-dimethyl-O-p-(dimethylsulfamoyl) phenyl phosphorothioate | 0 | 0 | 2 | 0 | ---- | 0 |
| O,O-diethyl-O-p-sulfamoylphenyl-phosphate | 0 | 0 | 0 | 0 | 0 | 0 |
| O,O-diethyl-O-p-sulfamoylphenyl-phosphorothioate | 0 | 1 | 0 | 0 | ---- | 0 |
| O,O-diethyl-O-p-(dimethylsulfamoyl)hpenyl phosphorothioate | 0 | 0 | 1 | 0 | 2 | 0 |
| O,O-diethyl-O-p-(dimethylsulfamoyl) phenyl phosphate | 0 | 0 | 0 | 0 | 0 | 0 |

Root Gall Rating: 0=no galls present; 1=a few galls; 2=most roots galled.
Phytotoxicity Rating: 0=no injury; 1=slight injury; 2=extensive injury.

Table II demonstrates not only that the compounds of this invention prevent nematode attack, but also that at optimum concentrations these compounds are not phytotoxic.

The nematocidal compounds with which this invention is concerned must be used in effective amounts. As noted above, they may be effectively applied to soil in various ways such as a dust for application with a conventional duster, as an emulsion for application with sprayers, or granules for application with conventional fertilizer spreaders, or absorbed on activated carbon for application to seeds. Whatever the method of application, a good practice is to apply the compounds at concentrations varying from 5 to 50 pounds per acre.

In addition to the compounds reported in the tables hereinabove, other compounds contemplated for use in the present invention which have been employed and found to be effective nematicides in either in vitro or in vivo, or both, include the following:

O,O,-dimethyl-O-p-(isopropylsulfamoyl)-phenylphosphorothioate

O,O-dimethyl-O-p-(isopropylsulfamoyl)-phenyl phosphate

O,O-diethyl-S-p-sulfamoylphenyl phosphorothioate

O,O-dimethyl-O-p-(ethylsulfamoyl)-phenyl phosphorothioate

O,O-dimethyl-O-p-(methylsulfamoyl)-phenyl phosphorothioate

O,O-dimethyl-O-[2-chloro-4-(dimethylsulfamoyl)-phenyl]-phosphorothioate

O,O - dimethyl-O-p-(diethylsulfamoyl)-phenyl phosphate

I claim:

1. A method for controlling nematodes in the soil which comprises applying to nematode infested soil a compound of the formula:

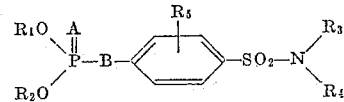

in which $R_1$ and $R_2$ are alkyl groups of from 1 to 3 carbon atoms, A and B are selected from the group consisting of O and S, $R_3$ and $R_4$ are selected from the group consisting of hydrogen and lower alkyl and $R_5$ is selected from the group consisting of hydrogen, halogen and lower alkyl.

2. A method according to claim 1 in which the compound is dimethyl p-(dimethylsulfamoyl)phenyl phosphate.

3. A method according to claim 1 in which the compound is diethyl p-(dimethylsulfamoyl)phenyl phosphate.

4. A method according to claim 1 in which the compound is diethyl p-sulfamoylphenyl phosphate.

5. A method according to claim 1 in which the compound is O,O-diethyl-O-p-(dimethylsulfamoyl)phenyl phosphorothioate.

6. A method according to claim 1 in which the compound is O,O-dimethyl-O-p-(dimethylsulfamoyl)phenyl phosphorothioate.

7. A method of controlling nematodes in the soil which comprises applying to nematode infested soil a mixture of a finely divided inert granular material and a compound of the formula:

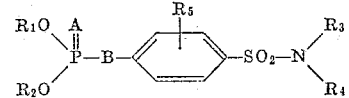

in which $R_1$ and $R_2$ are alkyl groups of from 1 to 3 carbon atoms, A and B are selected from the group consisting of O and S, $R_3$ and $R_4$ are selected from the group consisting of hydrogen and lower alkyl and $R_5$ is selected from the group consisting of hydrogen, halogen and lower alkyl.

8. A method according to claim 7 characterized in that a mixture of the compound and a finely divided inert granular material is applied as a dust on seed planted in the soil.

9. A method of controlling nematodes in the soil which comprises applying to nematode infested soil an aqueous emulsion of a compound of the formula:

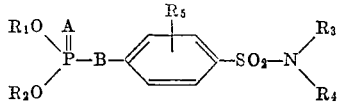

in which $R_1$ and $R_2$ are alkyl groups of from 1 to 3 carbon atoms, A and B are selected from the group consisting of O and S, $R_3$ and $R_4$ are selected from the group consisting of hydrogen and lower alkyl and $R_5$ is selected from the group consisting of hydrogen, halogen and lower alkyl.

10. A method for controlling nematodes which comprise contacting nematodes with an effective amount of a compound of the formula:

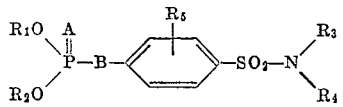

in which $R_1$ and $R_2$ are alkyl groups of from 1 to 3 carbon atoms, A and B are selected from the group consisting of O and S, $R_3$ and $R_4$ are selected from the group consisting of hydrogen and lower alkyl and $R_5$ is selected from the group consisting of hydrogen, halogen and lower alkyl.

References Cited by the Examiner
UNITED STATES PATENTS 3,005,002  10/61  Berkelhammer _____ 167—30
3,005,004  10/61  Berkelhammer _____ 167—30

LEWIS GOTTS, *Primary Examiner.*

JULIAN LEVITT, *Examiner.*